United States Patent [19]

McCarty et al.

[11] Patent Number: 5,281,094
[45] Date of Patent: Jan. 25, 1994

[54] ELECTROMECHANICAL APPARATUS FOR VARYING BLADE OF VARIABLE-PITCH FAN BLADES

[75] Inventors: Frederick B. McCarty, San Pedro; Leroy A. Fizer, Huntington Beach; Daniel E. Wilson, Wilmington; Kenneth L. Wuertz, Torrance, all of Calif.

[73] Assignee: AlliedSignal Inc, Morris Township, Morris County, N.J.

[21] Appl. No.: 949,295

[22] Filed: Sep. 22, 1992

Related U.S. Application Data

[63] Continuation-in-part of Ser. No. 699,399, May 13, 1991, abandoned.

[51] Int. Cl.$^5$ ............................................. F04D 29/36
[52] U.S. Cl. ................................. 416/147; 416/159; 416/162; 318/722
[58] Field of Search ............... 416/147, 151, 160, 162, 416/159, 25, 170 R, 3, 155, 156; 318/722, 723

[56] References Cited

U.S. PATENT DOCUMENTS

| | | |
|---|---|---|
| 1,951,320 | 3/1934 | Blanchard . |
| 2,346,007 | 4/1944 | Chillson . |
| 2,370,135 | 2/1945 | Berliner . |
| 2,488,392 | 11/1949 | Forsyth . |
| 2,490,329 | 12/1949 | Wilde, Jr. . |
| 2,612,228 | 9/1952 | Forsyth . |
| 2,705,537 | 4/1955 | Nichols . |
| 3,840,309 | 10/1974 | Eckes et al. . |
| 3,900,274 | 8/1975 | Johnston et al. ............... 416/160 X |
| 4,338,525 | 7/1982 | Kilgore . |
| 4,367,413 | 1/1983 | Nair . |
| 4,464,579 | 8/1984 | Schwarz . |
| 4,534,524 | 8/1985 | Aldrich . |
| 4,578,019 | 3/1986 | Safarik . |
| 4,640,668 | 2/1987 | Yang . |
| 4,660,437 | 4/1987 | Scott . |
| 4,682,094 | 7/1987 | Kuroiwa . |
| 4,757,240 | 7/1988 | Mizobuchi et al. . |
| 4,895,005 | 1/1990 | Norbeck et al. . |
| 4,916,368 | 4/1990 | Onoda et al. . |
| 4,965,477 | 10/1990 | Stadler et al. . |

FOREIGN PATENT DOCUMENTS

3406634A1  8/1985  Fed. Rep. of Germany .

OTHER PUBLICATIONS

"Direct and Alternating Current Machinery" 2nd Edition by Jack Rosenblatt and M. Harold Friedman: Chapter 17 Polyphase Induction Motor, pp. 265-266, Chapter 18 pp. 349-351, 358-360.

*Primary Examiner*—John T. Kwon
*Attorney, Agent, or Firm*—Joseph R. Black; Robert A. Walsh

[57] ABSTRACT

Blade pitch of variable pitch blades is changed by an actuator having first and second ac machines. The first ac machine is excited with ac power to apply a motoring torque to a control shaft of the actuator, thereby causing blade pitch to change in one direction. The second ac machine is excited with appropriate power to apply a braking torque to the control shaft, thereby causing blade pitch to change in an opposite direction. When the second ac machine is an induction machine, dc excitation will brake the control shaft. When the second ac machine is a synchronous machine, an ac excitation causing a retarding magnetic field will brake the control shaft.

18 Claims, 4 Drawing Sheets

ELECTROMECHANICAL APPARATUS FOR VARYING BLADE OF VARIABLE-PITCH FAN BLADES

CROSS-REFERENCE TO RELATED APPLICATION

This is a continuation-in-part of application Ser. No. 07/699,399 filed on May 13, 1991, now abandoned.

FIELD OF THE INVENTION

This invention relates in general to actuation systems for gas turbine engines and in particular to ac machines for varying the blade pitch of variable-pitch fan blades.

BACKGROUND OF THE INVENTION

Turbofan engines have proven to be desirable for aircraft that travel at subsonic speeds. A turbofan engine utilizes energy from a jet stream of gas to turn a turbine shaft. The shaft turns a ducted fan assembly whose blades move a mass of air, providing a thrust that propels the aircraft. The thrust is varied by changing the pitch of the fan blades. During takeoff, when high thrust is required, the pitch of the blades is adjusted to produce maximum engine torque. At cruise, when lower speeds are required, the blade pitch is adjusted to provide optimum fuel efficiency. During landings, the pitch is adjusted to produce a reverse thrust, which brakes the aircraft. Among the advantages offered by variable pitch fan blades, fuel efficiency of the turbofan engine is increased since blade pitch can be varied to cater to ever-changing flight conditions. It is claimed that fuel consumption can be increased by as much as twelve percent by adjusting the pitch of the blades. Further, the reverse thrust capability permits the elimination of a thrust reversal mechanism. This offsets to a certain degree the weight and complexity introduced by the control system that varies blade pitch.

The fan blades are adjusted by an actuation system including a pitch-change gearbox that is located in the hub of the fan and rotated by the fan shaft. The gearbox has a control shaft that is rotated relative to the fan hub. Blade pitch is changed in one direction when the control shaft is rotated faster than the fan hub, and it is changed in the opposite direction when the control shaft is rotated slower than the fan hub.

The control shaft can be rotated by an electric motor such as the two-phase ac motor disclosed in Johnson et al. U.S. Pat. No. 3,900,274. Excitation power is supplied to the motor by two single phase generators, displaced by 90 degrees. Excitation polarity of the field coils of one of the generators is reversible in order to provide the motor with two phase power of reversible sequence.

This motor is mounted for rotation with the hub; therefore, both the rotor and stator of the motor are subjected to rotational stresses. Further, the power windings of the generators are in the same rotating frame of reference as the power windings of the motor; therefore, the generators cannot generate power to change blade pitch in the event the fan shaft stops rotating. As a consequence, the blades cannot be feathered during an in-flight engine failure.

SUMMARY OF THE INVENTION

Torques are applied to a control shaft of a blade pitch actuator for variable-pitch blades by apparatus according to this invention. The apparatus comprises means for providing a first excitation when blade pitch is to be changed in one direction and for providing a second excitation when blade pitch is to be changed in an opposite direction. The apparatus further comprises torque means for applying torques to the control shaft in response to the first and second excitations. The torque means provides a motoring torque in response to the first excitation and a braking torque in response to the second excitation.

The torque means can include at least one ac machine having a rotor and a stator. The disadvantages discussed above are overcome by securing the rotor for rotation with the control shaft and by securing the stator, which includes the power windings, to a non-rotational structure of the engine. Thus, the power windings can be connected to a stationary power supply. Further, the blades can be feathered even if the fan shaft does not rotate.

DETAILED DESCRIPTION OF THE INVENTION

Figure 1:
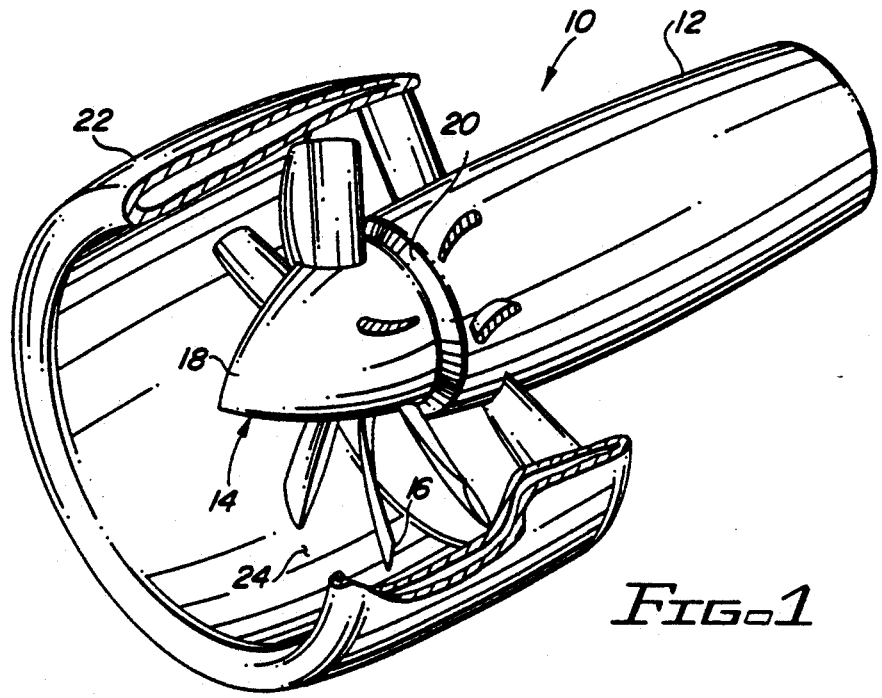
FIG. 1 is a perspective view of a ducted fan propulsion unit.

FIG. 1 shows a ducted fan propulsion unit 10 including a core engine 12 and a variable-pitch fan assembly 14. The core engine 12 has a turbine-type power plant that includes a compressor section (not shown), combustion section (not shown) and a turbine section (not shown). These sections are arranged in serial flow relation on either a single shaft or a dual shaft. Journalled to the forward portion of the engine 12 is a fan hub 16, which is rotated by the engine shaft. The fan assembly 14 includes a plurality of fan blades 18 that are circumferentially disposed about the fan hub 16 and extend radially therefrom. The fan assembly 14 is connected to the forward end of the engine core 12 adjacent its compressor inlet 20. A fan nacelle 22 circumscribes the fan assembly 14 to form an air inlet 24.

Figure 2:
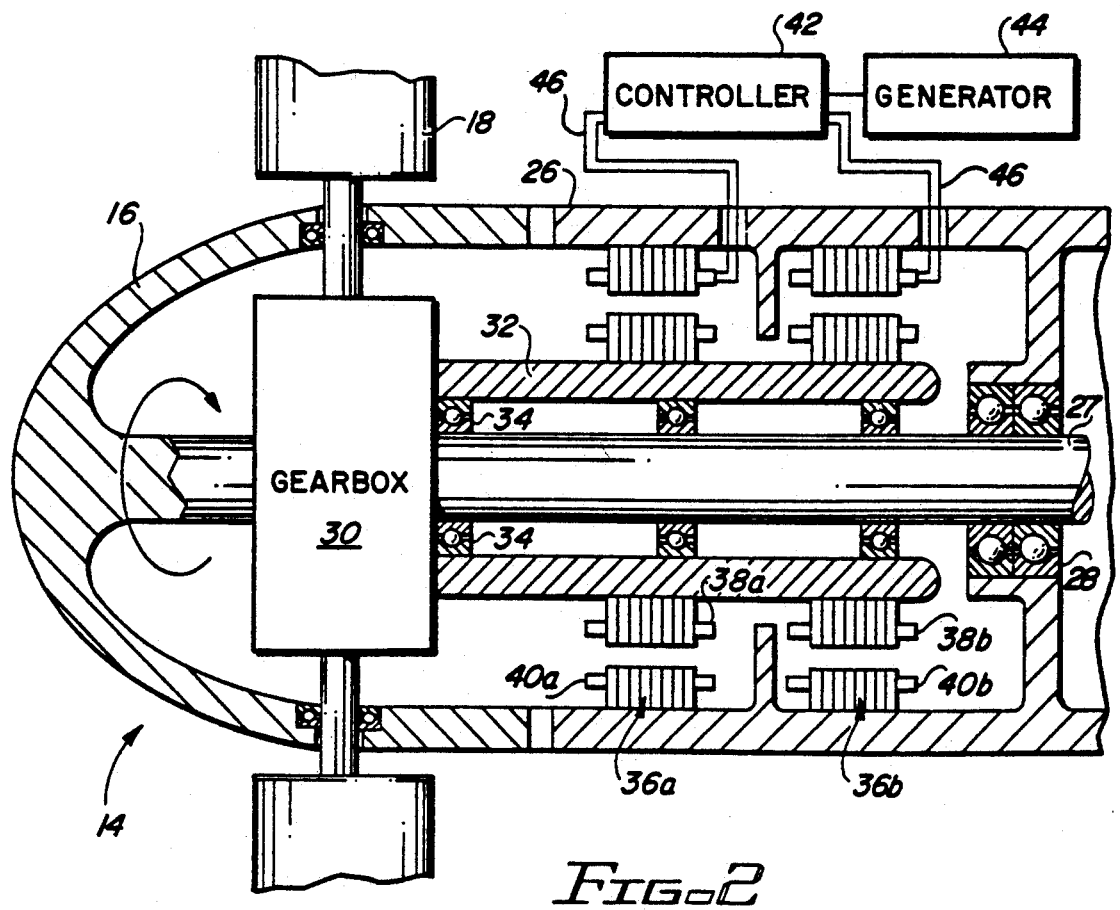
FIG. 2 is a schematic of a preferred embodiment of an actuation system according to this invention.

Referring now to FIG. 2, the forward portion of the engine 12 provides a stationary frame 26. The fan hub 16 is rotated by a fan shaft 27, which is journalled for rotation with respect to the stationary frame 26 by bearings 28.

The fan assembly 14 also includes a gearbox 30 which is rotated by the fan shaft 27. The gearbox 30 has a control shaft 32 that is journalled for rotation with respect to the fan hub 16 by bearings 34. When the fan hub 16 and control shaft 32 are rotated at different speeds the gearbox 30 changes the pitch of the fan blades 18. When the fan hub 16 and control shaft 32 are rotated at the same speed, the gearbox 30 maintains the blade pitch. The gearbox 30 is well known to those skilled in the art.

Torques are applied to the control shaft 32 by two ac machines: an induction motor 36a and an induction brake 36b. The machines 36a and 36b are constructed as rings inside the stationary frame 26, having squirrel cage rotors 38a and 38b that are secured for rotation with the control shaft 32 and stators 40a and 40b that are mounted to the stationary frame 26.

Blade pitch is varied by operating either the induction motor 36a or the induction brake 36b. To change blade pitch in one direction, the stator windings 40a of the induction motor 36a are momentarily excited with an alternating current to obtain a rotating magnetomotive force (mmf) vector that results in rotation of the rotor 38a at a speed greater than that of the fan hub 16. Thus, the control shaft 32 is advanced to a new angular position with respect to the fan hub 16.

When the commanded blade pitch position has been achieved, the control shaft 32 is constrained to rotate synchronously with the fan hub 16 by an anti-backdrive mechanism. Such mechanisms include solenoid brakes and mechanical "no-backs", which lock the control shaft 32 to the fan hub 16. Because the control shaft 32 and the fan hub 16 rotate at the same speed, the blade pitch is not changed. Rather than employing an anti-backdrive mechanism, the gearbox 30 can be provided with an efficiency of less than 50%.

To change pitch in an opposite direction, the anti-backdrive mechanism is released and the induction brake 36b is operated, slowing the speed of the control shaft 32 relative to the fan hub 16. The stator windings 40b of the induction brake 36b are excited with a direct current to obtain a stationary magnetic field, which slows the speed of the control shaft 32 relative to the fan hub 16.

In induction braking, it is well known that energy is dissipated into the rotor. However, when the duty cycle is short, the energy dissipated in the rotor is manageable.

The induction motor 36a could change pitch in the opposite direction by rotating the control shaft 32 in an opposite direction. However, it is more advantageous for the induction brake 36b to change pitch in the opposite direction where slowing of the control shaft 32 is required. Induction brakes are more efficient torque producers than induction motors under these conditions because the primary energy to perform the braking is supplied mechanically by the fan hub 16, not by the dc excitation. Further, braking torque is easier to control. The excitation to the stator windings of the induction brake 36b is dc-level controlled and, therefore, requires minimal external electrical power input.

Although a single induction machine can be used to provide both motoring and braking functions by simply using ac or dc excitations, two induction machines 36a and 36b may be preferred instead. Separate machines offer reliability advantages, and optimum machine design for motoring may require different stator windings and squirrel cage resistances than for braking. The stator 40b of the induction brake 36b can effectively use single or multiphase windings, whereas the stator 40a of the induction motor 36a requires multiphase windings.

A controller 42 operates the induction machines 36a and 36b by regulating the ac and dc excitations to their respective stators 40a and 40b. The controller 42 includes a solid state inverter that rectifies incoming alternating current and then converts the resulting direct current to alternating current of controlled voltage, frequency, and sequence. Solid state inverters in general are well known to those skilled in the art. The controller 42 supplies alternating current when blade pitch change is required by the induction motor 36a, and it supplies a variable direct current when blade pitch changed is required by the induction brake 36b.

The controller 42 can also excite the induction motor 36b to rotate the control shaft 32 synchronously with the fan hub 16. It excites the induction motor stator 40a at such a slip frequency that the induction motor rotor 38a is made to turn at the same speed as the fan hub 16. When the induction motor 36a is forced to turn at the same speed as the fan hub 16, the loads on the fan blades 18 cannot backdrive. When anti-backdriving is done electrically, a solenoid brake, mechanical no-back or an inefficient gearbox is not required.

Blade pitch can be changed when the engine 12 is not running simply by supplying the stator windings of the induction motor 36a with an external ac excitation of proper phase sequence for either clockwise or counterclockwise rotation. Thus, operation of the fan blade assembly 14 can be verified when the aircraft is on the ground or, more importantly, the blades 18 can be feathered if the engine 12 fails during flight.

Alternating current can be supplied to the controller 42 from the aircraft's power bus. Alternatively, AC power can be supplied by a dedicated generator 44. The generator 44 can be constructed as a ring inside the fan hub 16, or it can be mounted to a gearbox elsewhere in the engine.

If the controller 42 employs a four-quadrant inverter (i.e., double-ended inverter), the induction motor 36a can be made to function as a generator and the generator 44 can be made to function as a synchronous motor that turns the fan hub 16. The four-quadrant inverter allows power to flow in both directions. If the blades 18 are forced to move by a force other than from the gearbox 30 (e.g., wind), energy supplied by the force goes back into the control shaft 32 and causes it to rotate. The relative motion between the rotor 38a and stator 40a of the induction motor 36a causes a negative slip under proper excitation. Thus, the induction motor 36a generates electrical power. The power provided by the induction motor 36a flows through the double-ended inverter and into the stator of the generator 44, where a synchronous motor torque is created. As a result of this torque reversal, the generator 44 helps turn the fan hub 16, and energy is conserved.

Thus disclosed is electromechanical apparatus for torquing the control shaft 32 of an actuator for varying blade pitch. The braking torque applied to the control shaft 32 allows blade pitch to be changed by the mechanical power from the fan hub 16. While the braking torque is best applied by an ac machine, it can be applied instead by a hydraulic, pneumatic or mechanical brake.

The controller 42 and the stators of the induction machines 36a and 36b are mounted to a fixed structure, the frame 26, which provides good heat sink capabilities. Such mounting eliminates centrifugal forces on the stator windings which, in a large engine, can be substantial. Further, power lead wires 46 can be directly connected to the controller 42 without the need for slip rings or other types of rotating electrical contacts.

Surface speeds in the squirrel cage rotor 38a of the induction motor 36a are moderate, resulting in acceptable stresses. Thus, the use of squirrel cage rotors eliminates the need for insulated windings, thereby providing for a more rugged design.

Figure 3:
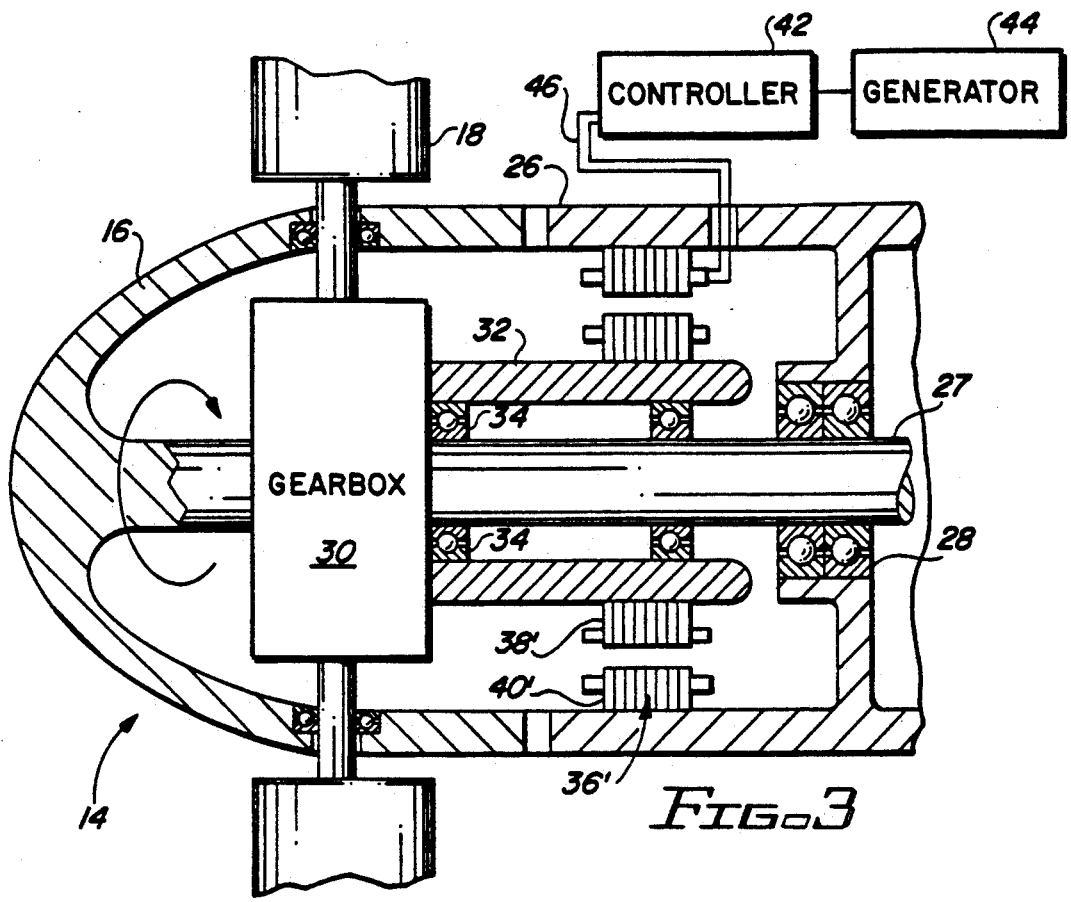
FIG. 3 is a schematic of another embodiment of an actuation system according to this invention.

FIGS. 3-7 show alternative embodiments of the actuation system shown in FIG. 2. In the embodiment of FIG. 3, the induction motor and brake 36a and 36b are replaced by a single induction machine 36', which performs both motoring and braking. To motor the control shaft 32, the controller 42 supplies alternating current to the stator windings 40' of the machine 36'; and to brake the control shaft 32, the controller 42 supplies a direct current to the stator windings 40' of the machine 36'.

It should be noted, however, that the induction machine 36' may not operate optimally for both induction braking and induction motoring in all applications. An optimum induction motor may have different stator windings than an optimum induction brake. Further, the rotor cage resistance of an optimum induction motor may be different from that of an optimum induction brake; therefore, a compromise cage resistivity must be selected.

Figure 4:
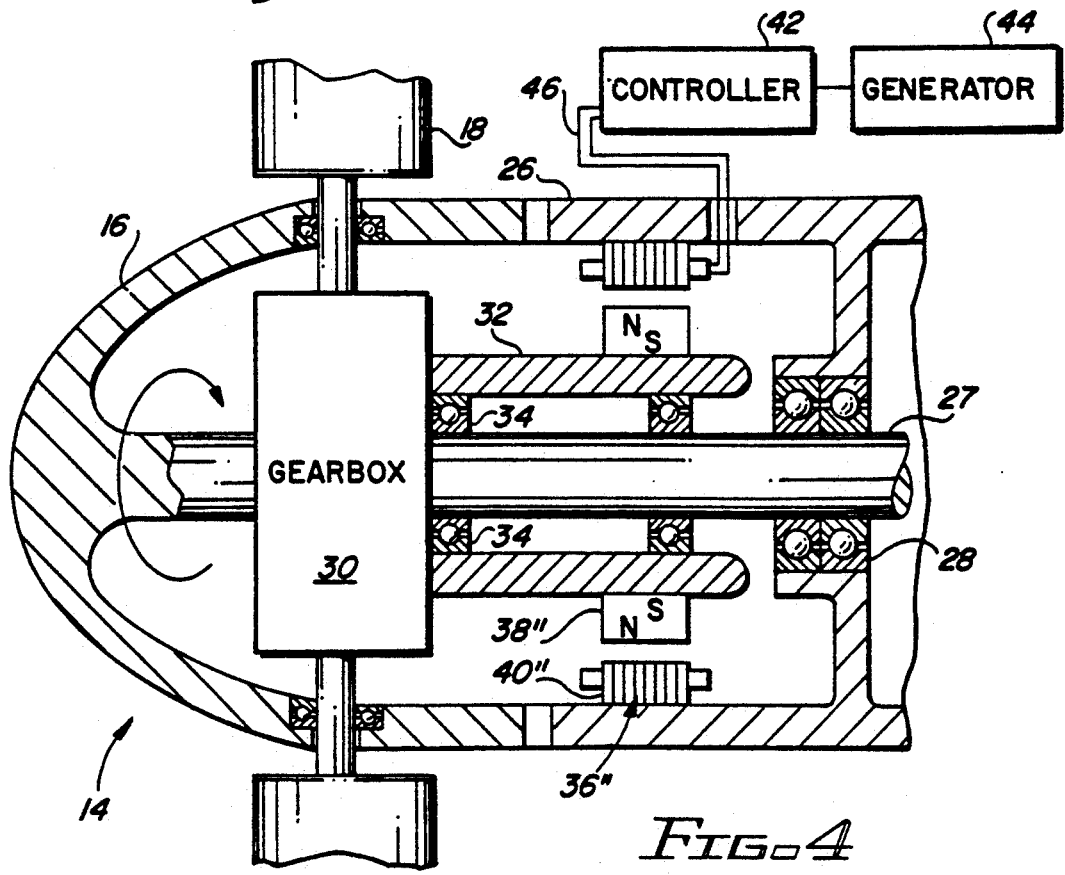
FIG. 4 is a schematic of yet another embodiment of an actuation system according to this invention.

In the actuation system of FIG. 4, the induction machine 36' is replaced with a synchronous machine 36". The rotor 38" of the synchronous machine 36" includes permanent magnets secured to the control shaft 32. To its advantage, the synchronous machine 36" is less sensitive than the induction machines 36a and 36b to the size of the air gap between the rotor and stator. In a synchronous machine, excitation is provided by permanent magnets which permit operation at unity power factor. By contrast, an induction machine must be excited by reactive current in its stator and the stator must operate at a lagging power factor. Thus, the VA rating for the induction motor stator and for the controller and generator which supply it is greater than for a synchronous machine. The VA rating is increased when the air gap increases. The gap requirement might be large to allow for installation tolerances and expansion of the rotor due to temperature and stress. Thus, the use of magnets allows for a larger air gap. It also provides excitation that reduces the burden on the inverter.

The controller 42 causes motoring of the control shaft 32 by exciting the stator 40" of the synchronous machine 36" at a leading phase relationship relative to the back EMF of the machine 36". Since this phase relation is positive, the synchronous machine 36" is excited to spin relatively faster than the fan hub 16. The controller 42 causes braking of the control shaft 32 by exciting the stator 40" at a lagging phase relationship to the synchronous machine 36" relative to its back EMF. The lagging phase relationship slows the rotation of the control shaft 32 relative to the fan hub 16. The controller 42 causes synchronous rotation of the control shaft 32 with the fan hub 16 by exciting the stator windings 40" with current of appropriate phase, frequency, and sequence.

Figure 6:
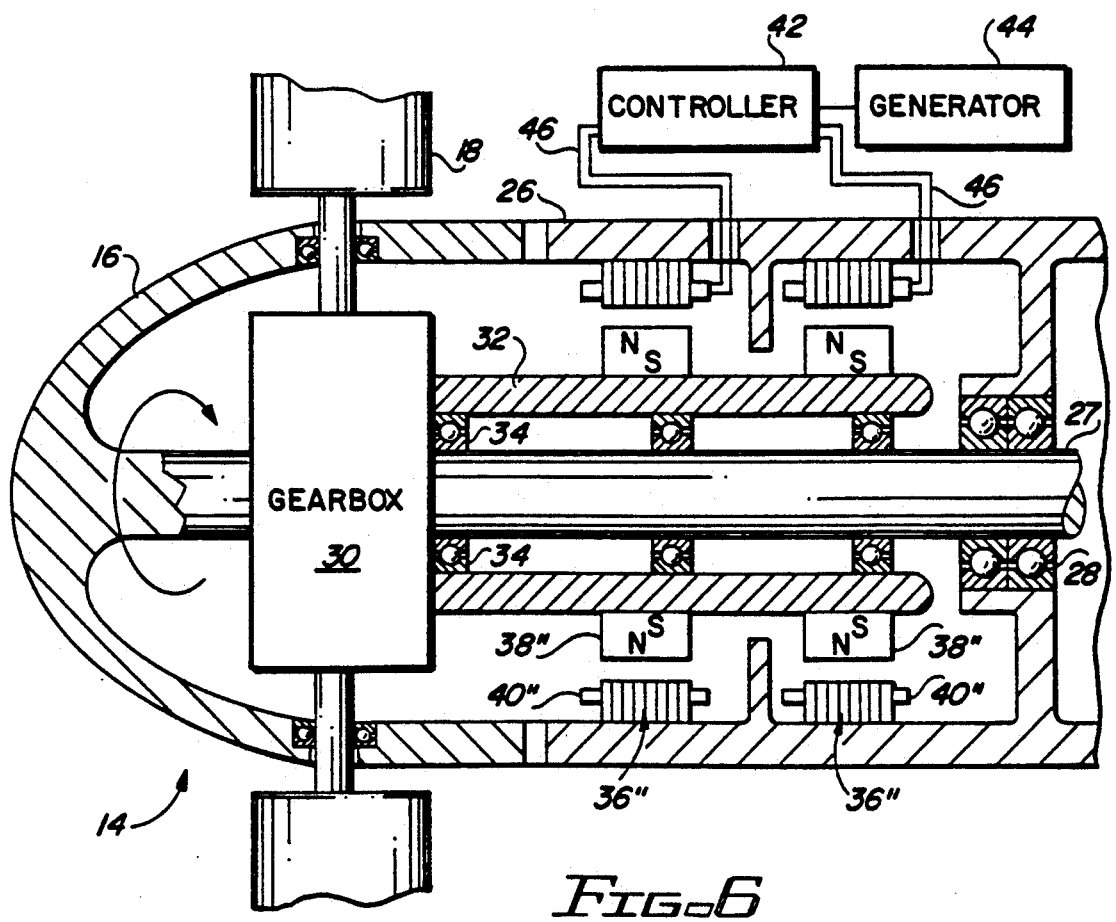
FIG. 6 is a schematic of still another embodiment of an actuation system according to this invention.

In yet another actuation system, a second synchronous machine 36" is employed for redundancy (see FIG. 6).

Figure 7:
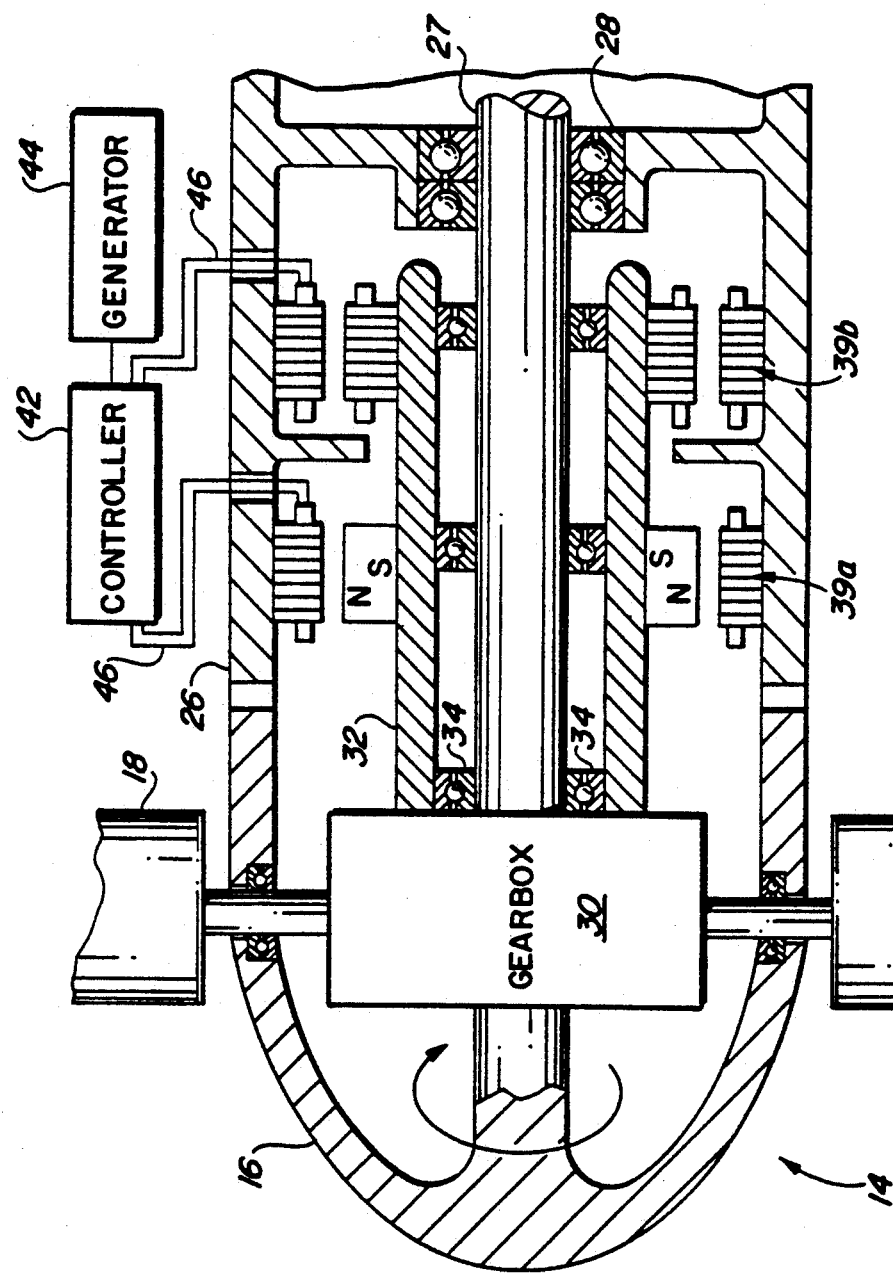
FIG. 7 is a schematic of still another embodiment of an actuation system according to this invention.

In still another actuation system, a synchronous machine 39a applies a motoring torque to the control shaft 32, and an induction machine 39b applies a braking torque to the shaft 32 (see FIG. 7).

Figure 5:
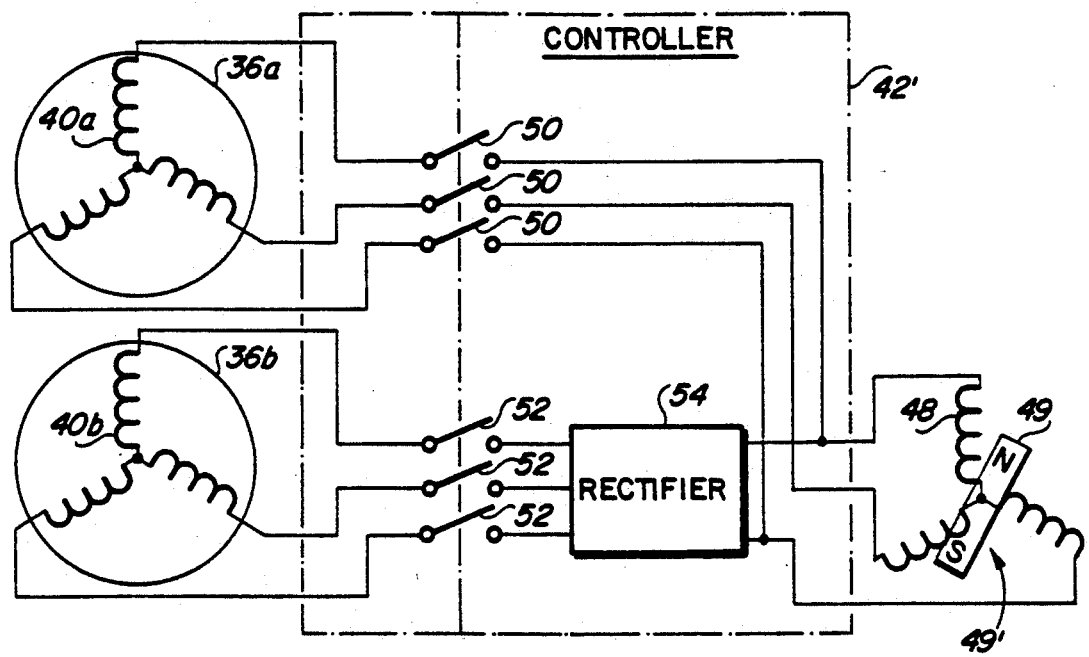
FIG. 5 is a schematic of a controller for an actuation system according to this invention.

In the actuation system of FIG. 5, the induction brake 36b is supplied with dc excitation power and the induction motor 36a is supplied with ac excitation power from a dedicated generator 44'. The generator stator 48 is provided with more poles than the stator 40a of the induction motor 36a. The relative number of poles on respective stators 40a and 48 determines the relative speed between the control shaft 32 and the fan hub 16.

A controller 42' employs solid state or mechanical switches 50, 52 and a controlled rectifier 54 instead of a solid-state inverter. A first set of switches 50 couples the windings of the generator stator 48 to the stator windings of the induction motor 36a. When these switches 50 are closed, the induction motor 36a is excited with ac power supplied directly by the generator 44. A second set of switches 52 couples the windings 40b of the brake stator 36b to the rectifier 54. When these switches 52 are closed, the induction brake 36b is excited with dc power supplied directly by the controlled rectifier. When both sets of switches 50 and 52 are left open, the machines 36a and 36b are not excited and, as a result, the control shaft 32 is rotated synchronously with the fan hub 16.

When the generator rotor 49 turns as fast as the fan hub 16, nearly equal pitch change rates in each direction are accomplished by providing the stator 48 of the generator 44' with twice as many poles as the stator 40a of the induction motor 36a. Thus, the motor stator 40a can be selectively excited with a magnetic field rotating at twice the speed of the hub 16 or at zero speed.

When the engine 12 is not running, blade pitch can be changed only by disconnecting the generator 44' and providing excitation power from an external power source, such as ground power. To prevent rotation of the fan hub 16 during pitch change operation, the generator stator 48 could be excited with dc power. In this manner, operation of the actuation system can be verified when the aircraft is on the ground.

It will be understood that the embodiments herein are merely exemplary and that a person skilled in the art may make many variations and modifications to the actuation system without departing from the spirit and scope of the invention. For example, the actuation systems could employ additional machines for redundancy. Actuation systems employing two or more machines could use combinations of synchronous and induction machines. All such modifications are intended to be within the scope of the invention as defined in the appended claims.

We claim:

1. Apparatus for torquing a control shaft of a blade pitch actuator for variable-pitch blades, comprising:
   means for providing a first excitation when blade pitch is to be changed in one direction and for providing a second excitation when blade pitch is to be changed in an opposite direction;
   a first ac machine for applying a motoring torque to said control shaft in response to said first excitation; and
   a second ac machine for applying a braking torque to said control shaft in response to said second excitation.

2. The apparatus of claim 1, wherein said first and second ac machines are induction machines having squirrel cage rotors secured for rotation to said control shaft, and wherein said excitation means provides ac excitation to said first induction machine and dc excitation to said second induction machine.

3. The apparatus of claim 2, wherein said stator of said first induction machine has multiple phases, and wherein said stator of said second induction machine has at least one phase.

4. The apparatus of claim 2, wherein said excitation means includes:
   a generator having a rotor and a stator, said generator stator having a greater number of poles than said stator of said first induction machine;

rectifier means for rectifying power from said generator stator; and switch means for electrically coupling said second ac machine stator to said rectifier means when said control shaft is to be braked, and for electrically coupling said first ac machine stator to said generator stator when said control shaft is to be motored.

5. The apparatus of claim 1, wherein said first and second ac machines are synchronous machines having permanent magnet rotors secured for rotation to said control shaft, and wherein said second synchronous machine backs up said first synchronous machine.

6. The apparatus of claim 1, wherein said first ac machine includes a synchronous motor whose permanent magnet rotor is secured for rotation with said control shaft, wherein said second ac machine includes an induction brake having a squirrel cage rotor secured for rotation to said control shaft, and wherein said excitation means provides excitation to said synchronous motor and dc excitation to said induction brake.

7. The apparatus of claim 1, wherein at least one of said ac machines has its rotor secured for rotation with said control shaft and its stator secured to a non-rotational structure of a turbine engine.

8. The apparatus of claim 1, wherein said excitation means includes a solid state inverter for regulating said first and second excitations to said first and second ac machines.

9. The apparatus of claim 8, wherein said excitation means further includes an electrical generator having a permanent magnet rotor and stator windings surrounding said rotor, said generator stator windings supplying alternating current to said inverter when said rotor is rotated relative to said stator windings.

10. The apparatus of claim 9, wherein said inverter is a four quadrant inverter, whereby one of said ac machines can also function as a generator and said generator can also function as an ac machine.

11. Apparatus for torquing a control shaft of a blade pitch actuator for variable-pitch blades, comprising:
   means for providing an ac excitation when blade pitch is to be changed in one direction and for providing a dc excitation when blade pitch is to be changed in an opposite direction; and
   induction machine means for applying a motoring torque to said control shaft in response to said ac excitation and for applying a braking torque to said control shaft in response to said dc excitation.

12. The apparatus of claim 11, wherein said induction machine means includes an induction machine for applying a motoring torque to said control shaft in response to said ac excitation and a braking torque to said control shaft in response to said dc excitation.

13. The apparatus of claim 12, wherein said induction machine includes a squirrel cage rotor that is secured for rotation to said control shaft.

14. The apparatus of claim 13, wherein said excitation means includes:
   a generator having a rotor and a stator, said generator stator having a greater number of poles than said stator of induction machine;
   rectifier means for rectifying power from said generator stator; and
   switch means for electrically coupling said induction machine stator to said rectifier means when said control shaft is to be braked, and for electrically coupling said induction machine stator to said generator stator when said control shaft is to be motored.

15. The apparatus of claim 11, wherein said excitation means includes a solid state inverter for regulating said ac and dc excitations to said induction machine means.

16. The apparatus of claim 15, wherein said excitation means further includes an electrical generator having a permanent magnet rotor and stator windings surrounding said rotor, said generator stator windings supplying alternating current to said inverter when said rotor is rotated relative to said stator windings.

17. The apparatus of claim 16, wherein said inverter is a four quadrant inverter, whereby said induction machine means can also function as a generator and said generator can also function as an ac machine.

18. A method of torquing a control shaft of a blade pitch actuator for variable pitch fan blades, comprising the step of induction braking said shaft wherein said actuator includes an induction machine having its rotor secured to said control shaft and its stator winding surrounding said rotor, and wherein said shaft is induction braked by supplying a dc excitation to at least one of said stator windings.

* * * * *